(12) United States Patent
Lee et al.

(10) Patent No.: US 8,355,941 B2
(45) Date of Patent: Jan. 15, 2013

(54) OPTIMAL PLANNING OF BUILDING RETROFIT FOR A PORTFOLIO OF BUILDINGS

(75) Inventors: Young Min Lee, Old Westbury, NY (US); Chandrasekhara K. Reddy, Kinnelon, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/150,721

(22) Filed: Jun. 1, 2011

(65) Prior Publication Data

US 2012/0310689 A1 Dec. 6, 2012

(51) Int. Cl.
*G06F 17/50* (2006.01)
(52) U.S. Cl. .................................................. 705/7.11
(58) Field of Classification Search .................. 705/7.11
See application file for complete search history.

(56) References Cited

U.S. PATENT DOCUMENTS

| | | | | |
|---|---|---|---|---|
| 2009/0313083 | A1* | 12/2009 | Dillon et al. ..................... | 705/10 |
| 2010/0275967 | A1* | 11/2010 | Seemann ........................ | 136/244 |
| 2011/0016017 | A1* | 1/2011 | Carlin et al. .................. | 705/26.4 |
| 2012/0166616 | A1* | 6/2012 | Meehan et al. ............... | 709/224 |

OTHER PUBLICATIONS

Lee, et al. "Modeling and Simulation of Building Energy Performance for Portfolios of Public Buildings." Proceedings of the 2011 Winter Simulation Conference, pp. 915-927, © 2011.*

Rode, P.E., Paul. "The Empire State Building: Repositioning an Icon as a Model of Energy Efficient Investment." ACEEE National Symposium on Market Transformation. Apr. 12, 2011.*

Anonymous. "Baker Signs Contract with TRIRIGA® as Customer and Strategic Partner for TREES™ Real Estate Management/Sustainability System." Business Wire, Dec. 9, 2008.*

"Delivering Cost Effective Carbon Saving Measures to Existing Homes." Business Research Establishment Ltd., Oct. 2007.*

Gutowski, et al. "Energy Payback for Energy Systems Ensembles During Growth." IEEE, International Symposium on Sustainable Systems and Technologies, Washington D.C., May 16-19, 2010.*

Yee, et al. "A Screening and Optimization Approach for the Retrofit of Heat Exchanger Networks." Department of Chemical Engineering, paper 133, 1988.*

* cited by examiner

*Primary Examiner* — Susanna M Meinecke Diaz
(74) *Attorney, Agent, or Firm* — Scully, Scott, Murphy & Presser, P.C.; Daniel P. Morris, Esq.

(57) ABSTRACT

Generating an optimal planning of building retrofit for a portfolio of buildings may include providing a plurality of objective functions that may be selected for maximizing cost reduction, maximizing green house gas emission reduction, or maximizing energy reduction, or combinations thereof. The objective function may be solved based on information including at least a retrofit cost for retrofitting a building, payback period specifying the length of time needed to recover the retrofit cost, a budget available for retrofitting the building, expected price of energy, estimated energy savings from retrofitting and estimated green house gas emission from retrofitting. The planning of building retrofit may be generated based on the solutions of one or more of the objective functions, which may provide for an optimal plan of building retrofit.

21 Claims, 10 Drawing Sheets

OPTIMAL PLANNING OF BUILDING RETROFIT FOR A PORTFOLIO OF BUILDINGS

FIELD

The present application relates generally to building retrofitting and energy consumption in buildings, and more particularly to planning, for instance, optimally, building retrofit for a portfolio of buildings.

BACKGROUND

Saving energy, improving energy efficiency of energy consumption and reducing greenhouse gas (GHG) emissions are key initiatives in many cities and municipalities and for building owners and operators. Inventors in this disclosure have recognized that in order to reduce energy consumption in buildings, one should understand patterns of energy usage, characteristics of building structures, operations and occupant behaviors that influence energy consumption. However, building structures often have different characteristics, for instance, each being built with unique or different characteristics and designs from one another. Due to such heterogeneity in buildings, improvements that can be made to buildings to save energy and their effectiveness can be very different for different buildings.

One way to reduce energy consumption is to retrofit buildings to improve the energy efficiency. Examples of retrofit include window replacement, e.g., from single glazing to double glazing; adding insulation to roof, wall or ground slab; replacing boilers; installing window shading; replacing boiler insulation; roof coloring, and others. Each retrofit involves cost, but mostly likely will save certain amount of energy and its costs, mostly likely will also reduce GHG emission, and may realize return of investment in a few years (known as payback periods). Building portfolio owners (e.g., cities, municipalities, schools, etc.) usually have a limited amount of budget to spend for retrofit. When there are multiple buildings involved, it is not easy to decide which retrofit for which building should be selected within the limited budget and which would provide the more of the benefits. Therefore, the inventors in this application have recognized that it would be helpful to understand what would be an optimal retrofitting plan, for example, which buildings should be retrofitted, what would be type of retrofit, and what return on investment (ROI) would be realized, with the limited budget and goals of energy reduction, energy cost reduction and GHG emission.

BRIEF SUMMARY

A method of generating a planning of building retrofit for a portfolio of buildings, in one aspect, may include receiving input information including at least a retrofit cost for retrofitting a building, payback period specifying the length of time needed to recover the retrofit cost, a budget available for retrofitting the building, expected price of energy, estimated energy savings from retrofitting and estimated green house gas emission from retrofitting. The method may also include selecting an optimization model based on an objective, the objective including maximizing cost reduction, maximizing green house gas emission reduction, or maximizing energy reduction, or combinations thereof. The method may further include generating the planning of building retrofit based on the selected optimization model and the input information. The generated plan in one aspect is optimal in that the plan when carried out may maximize one or more of the selected objectives.

A system for generating a planning of building retrofit for a portfolio of buildings, in one aspect, may include a first optimization model with an objective function of maximizing cost reduction, a second optimization model with an objective function of maximizing green house gas emission reduction, and a third optimization model with an objective function of maximizing energy reduction. A module may be operable to execute on a processor, and further operable to receive a selected objective, and based on the selected objective, solve the first optimization model, the second optimization model, or the third optimization model. The module may solve the first optimization model, the second optimization model, or the third optimization model based on data including at least a retrofit cost for retrofitting a building, payback period specifying the length of time needed to recover the retrofit cost, budget available for retrofitting the building, expected price of energy, estimated energy savings from retrofitting and estimated green house gas emission from retrofitting. The module may further generate the planning of building retrofit based on the solving of the first optimization model, the second optimization model, or the third optimization model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one embodiment describes determining a retrofit plan for multiple buildings (e.g., a portfolio of buildings). The methodologies of the present disclosure in one embodiment provide and utilize one or more optimization methods that solve for and generate plans specifying which buildings should be retrofitted and the types of retrofits for those buildings within a budget, and at the same time considering cost and benefits of the retrofits.

In one aspect, a retrofit plan may be generated that maximizes reduction in usage of one or more energy types, reduction in green house gas emission, cost reduction, based on data associated with energy savings impact of retrofit, GHG emission reduction from retrofit, retrofit cost, expected energy price, payback period and budget for retrofit for portfolio of buildings. The energy saving and GHG emission reduction resulting from retrofit can be provided by a user of the present methods, but they can also be estimated by simulation models such as heat transfer model of building envelope and regression model of a building. The input data are associated with a specific building.

Figure 1:
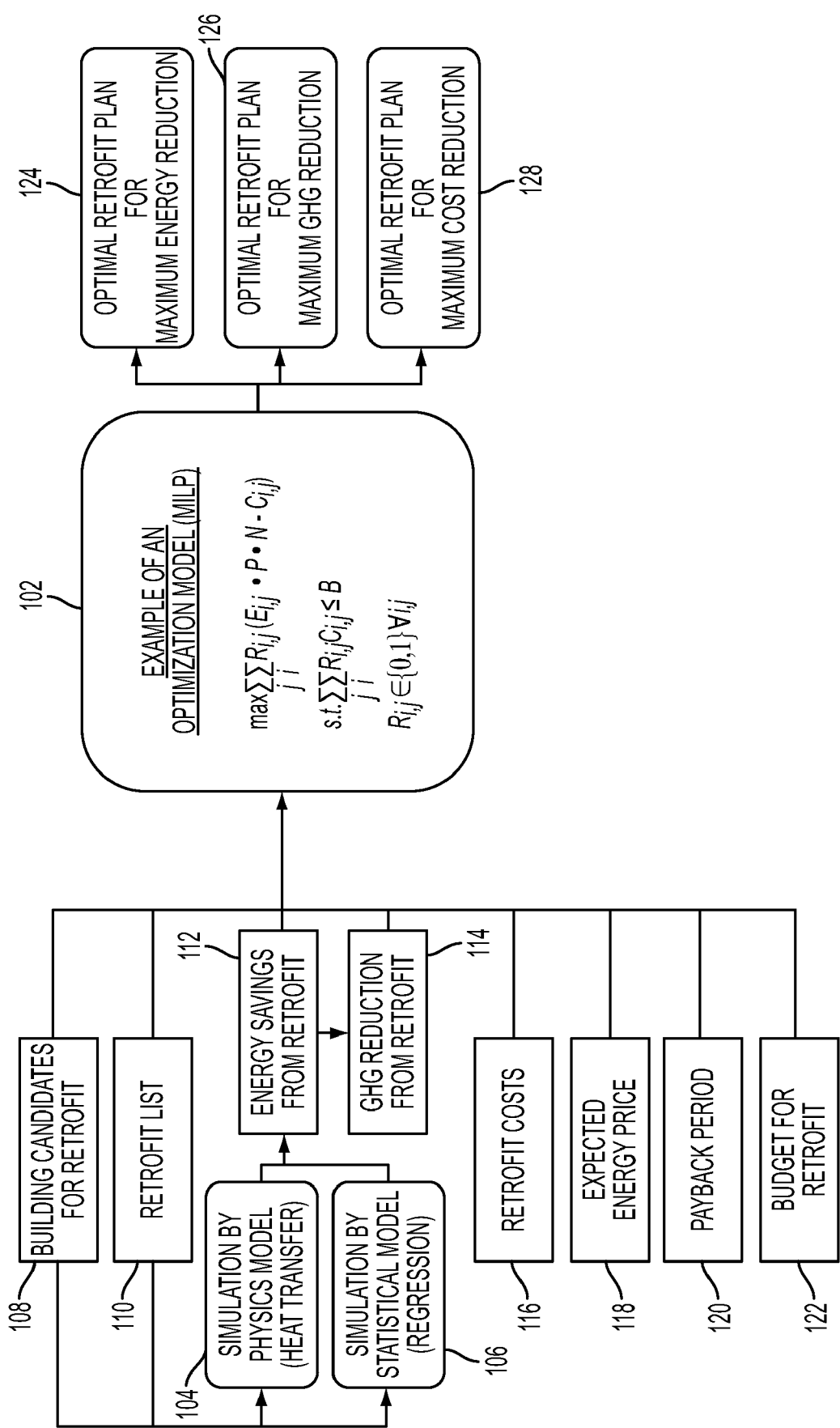
FIG. 1 is a diagram illustrating components of the present disclosure in one embodiment.

FIG. 1 is a diagram illustrating components of the present disclosure in one embodiment. An optimization model 102 is generated that takes into consideration factors such as the energy savings from retrofit, green house gas (GHG) emission from retrofit, retrofit cost, payback period, budget available for retrofit and expected price of energy. For instance, the inputs to the optimization model 102 may include a list of buildings which are considered to be retrofitted 108 (also referred to as building candidates) and retrofit list 110. Building candidates for retrofit 108 specify the buildings that are candidates for retrofitting. A retrofit list 110 lists items in the candidate building that are to be replaced or improved, for instance, windows, walls, roofs, heater system, air conditioning system, or others. Items to be retrofitted are also referred to as energy conservation measures (ECM). Other ECMs are possible, for example, any type of project implemented to reduce the consumption on energy in a building.

Retrofit costs 116, expected energy price 118, payback period 120 and budget for retrofit 122 may be also used as inputs to the optimization model 102. Retrofit costs 116 may specify in dollar amounts (or other currency amounts) how much it would cost to replace or improve one or more items listed in the retrofit list 110. Expected energy price 118 specifies price of energy source, e.g., price of oil, electricity, gas, or others, in the future time periods, which occur after the retrofits are completed. Payback period 120 is the length of time, during which the benefits of retrofits realized after the retrofits are completed, for instance, in units of years or other time metric. A budget for retrofit 122 specifies the budget allocated to the list of candidate buildings for retrofitting projects.

In one embodiment, the optimization model 102 is designed to also use energy savings from retrofit 112 and GHG reduction from retrofit 114 as input. These values can be known; but often they are not available. In the present disclosure in one embodiment, simulation models are used to determine the energy savings from retrofit 112 and GHG reduction from retrofit 114. For instance, a physics-based heat transfer model 104 is used to simulate energy savings based on retrofitting. A statistical model 106, for example, a regression model may be also used to simulate energy savings based on retrofitting. The models 104, 106 produce energy savings from retrofit and resulting GHG reduction from retrofit.

An optimization model 102 solves for optimal retrofit plan for maximum energy reduction 124, optimal retrofit plan for maximum GHG reduction 126 or optimal retrofit plan for maximum cost reduction 128.

An optimization model 102 that solves for optimal retrofit plan for maximum cost reduction 128 in one aspect may be generated as the following objective function:

$$\max ROI = \max \sum_{i \in ECM} \sum_{j \in BLD} \sum_{k \in TIME} R_{i,j}(E_{i,j} \cdot P_k \cdot N_i - C_{i,j})$$

The above objective function maximizes return of investment (ROI) which is expressed as the overall energy savings in a monetary unit from all the selected retrofits from all the selected buildings during the payback periods minus the overall costs of implementing the selected retrofits of the selected buildings.

An optimization model 102 that solves for optimal retrofit plan for maximum energy reduction 124 in one aspect may be generated as the following objective function:

$$\max \text{Energy Reduction} = \max \sum_{i \in ECM} \sum_{j \in BLD} R_{i,j} \cdot E_{i,j}$$

The above objective function maximizes energy reduction which is expressed as the sum of energy reduction resulting from all the selected retrofits from all the selected buildings.

An optimization model 102 that solves for optimal retrofit plan for maximum GHG reduction 126 in one aspect may be generated as the following objective function:

$$\max GHG \text{ Reduction} = \max \sum_{i \in ECM} \sum_{j \in BLD} \sum_{l \in ENG} R_{i,j}(E_{i,j} \cdot G_l)$$

The above objective function maximizes GHG reduction which is expressed as the sum of GHG emission reduction resulting from all the selected retrofits from all the selected buildings.

Constraints in the above optimization models may include:

$$s.t. \sum_j \sum_i R_{i,j} C_{i,j} \leq B$$

$$R_{i,j} \in \{0, 1\} \; \forall \, i, j$$

The above constraint dictates that the cost for retrofitting be less or equal to a given budget. This constraint may apply to all three types of objective functions described above.

In all of the above objective functions, the following notations apply:
$i \in \{ECM\}$ referring to energy conservation measure (ECM), e.g., the items on the retrofit list (e.g., 110 in FIG. 1);
$j \in \{Bld\}$ referring to building candidates for retrofit (e.g., 108 in FIG. 1);
$k \in \{Time\}$ representing a period of future time after retrofits are completed, e.g., year 1 after retrofits are completed;
$l \in \{Eng\}$ representing energy type;
$R_{i,j} \in \{0,1\}$ decision variables representing retrofit, indicating whether retrofit i for building j is to be done (1) or not done (0);
$C_{i,j}$=cost for the implementing retrofit such as replacing windows (e.g., 116 in FIG. 1);
$E_{i,j}$=energy reduction of retrofit i for building j (e.g., 112 in FIG. 1);
$P_k$=(expected) energy price of period k (e.g., 118 in FIG. 1);
$N_i$=payback in number of periods (e.g., years), (e.g., 120 in FIG. 1);
B=budget (e.g., 122 in FIG. 1); $G_l$=GHG emission for each energy type (e.g., 114 in FIG. 1).

In one embodiment of the present disclosure, a heat transfer model 104 may be developed and applied to determine energy savings from retrofit 112. A statistical model 106, for example, a regression model, may be developed and applied to determine energy savings from retrofit 112. For instance, the heat transfer model 104 may be applied to determine energy savings from retrofits during heating and cooling of a building. A statistical model also may be applied to determine energy savings from retrofits during heating and cooling of a building. The models 104, 106 may be used to determine other energy savings in a building. When a retrofit (110) is considered for a building (108) as in the inputs to the optimization problem described above, the simulation models (104 or 106) may be able to predict energy saving from the retrofit (e.g., adding wall insulation coefficient to the heat transfer model (104)), and from the estimated energy savings, GHG emission reduction can be calculated.

In one embodiment of the present disclosure, the heat transfer model 104 may have the following general form:

$$R'_{wall} \to Q_{sys} =$$

$$(h_{q,wall}A_{wall} + h_{q,roof}A_{roof} + h_{q,win}A_{win} + \dot{m}_{inf}C_p)\int_{t_0}^{t_1}(T_z - T_{amb}(\tau))^+ d\tau =$$

$$\left(\frac{A_{wall}}{R_{wall}} + \frac{A_{roof}}{R_{roof}} + \frac{A_{window}}{R_{window}} + \dot{m}_{inf}C_p\right)\int_{t_0}^{t_1}(T_z - T_{amb}(\tau))^+ d\tau$$

From the above heat transfer model, $Q_{sys}$, which represents heat energy required to be provided to a building for requested comfort (e.g., in cooling or heating a building) may be obtained.

$h_{q,wall}, h_{q,roof}, h_{q,win}, \dot{m}_{inf}$ denote heat transfer coefficients for wall, roof, windows and infiltration of outside air into the building respectively.

$A_{wall}, A_{roof}, A_{win}$ denote area of wall, roof and window in a building.

$C_p, T_z, T_{amb}$ denote specific heat of air inside building, temperature of inside of building (zone), and ambient (outside) temperature. $\tau$ is simply integration variable.

$R_{wall}, R_{roof}, R_{win}$ denote heat resistance coefficients (reciprocal of heat transfer coefficients) of wall, roof and window respectively.

The equation above describes that the heat required to be provided to a building is equal amount of the heat needed to overcome the heat transferred from the outside air (ambient) into the inside of the building through the wall, roof, window and infiltration (open door, window and cracks in the wall etc.).

Different variations of the above model may be generated and used, for example, to model different retrofit items (e.g., other than or in addition to "wall", "roof", or "window", specified in the above equation).

In one embodiment of the present disclosure, the statistical model 106 may have the following general form:

$$E_{j,elec} = \beta_0 + \beta_1 x_1 + \beta_2 x_2 + \beta_3 x_3 + \ldots + \epsilon_{elec} x_3 \to$$

$$E_{j,gas} = \beta_0 + \beta_1 x_1 + \beta_2 x_2 + \beta_3 x_3 + \ldots + \epsilon_{gas}$$

The above regression model may predict energy savings, $E_{j,elect}$ and $E_{j,gas}$. $E_{j,elect}$ represents electric (elect) energy saved in building j. $E_{j,gas}$ represents gas (gas) energy saved in building j.

The above regression model may be used to predict other type of energy savings, e.g., $E_{j,type}$ where "type" refers to the type of energy.

The above models are regression models that formulate energy usage in terms of building's characteristics ($x_i$). $\beta_i$ (where i=1, 2, 3, . . . ) represents a coefficient value (e.g., a weight value) that each building characteristic ($x_i = x_1, x_2, x_3, \ldots$) contributes to the energy usage in that building. $\beta_0$ is a constant value contributing to that building's energy usage, which is not associated with building characteristics. The regression models may be generated or developed based on historical data associated with energy usage in buildings with those building characteristics. $\epsilon$ (of elec (electricity) or gas or other type of energy) is an error value, which cannot be attributed to the building characteristics or other energy use in a building. The regression model provides the coefficients associated with different building characteristics based on the past usage data. The model with the determined coefficients then may be used to predict future energy usage in a building having those characteristics. Examples of building characteristics include, but are not limited to, gross floor area (GFA), age of the building and its equipment, occupancy related data, operating hours, number of equipment, area of building cooled, area of building heated and others conditions of the building corresponding to the time period of the energy consumption data, and types of activities that may take place in the building, and other. For example, retrofit of a building may be a reduction of cooling area of a building, and the electricity equation above can have reduced value of $x_1$, thus reducing electric energy required.

Figure 2:
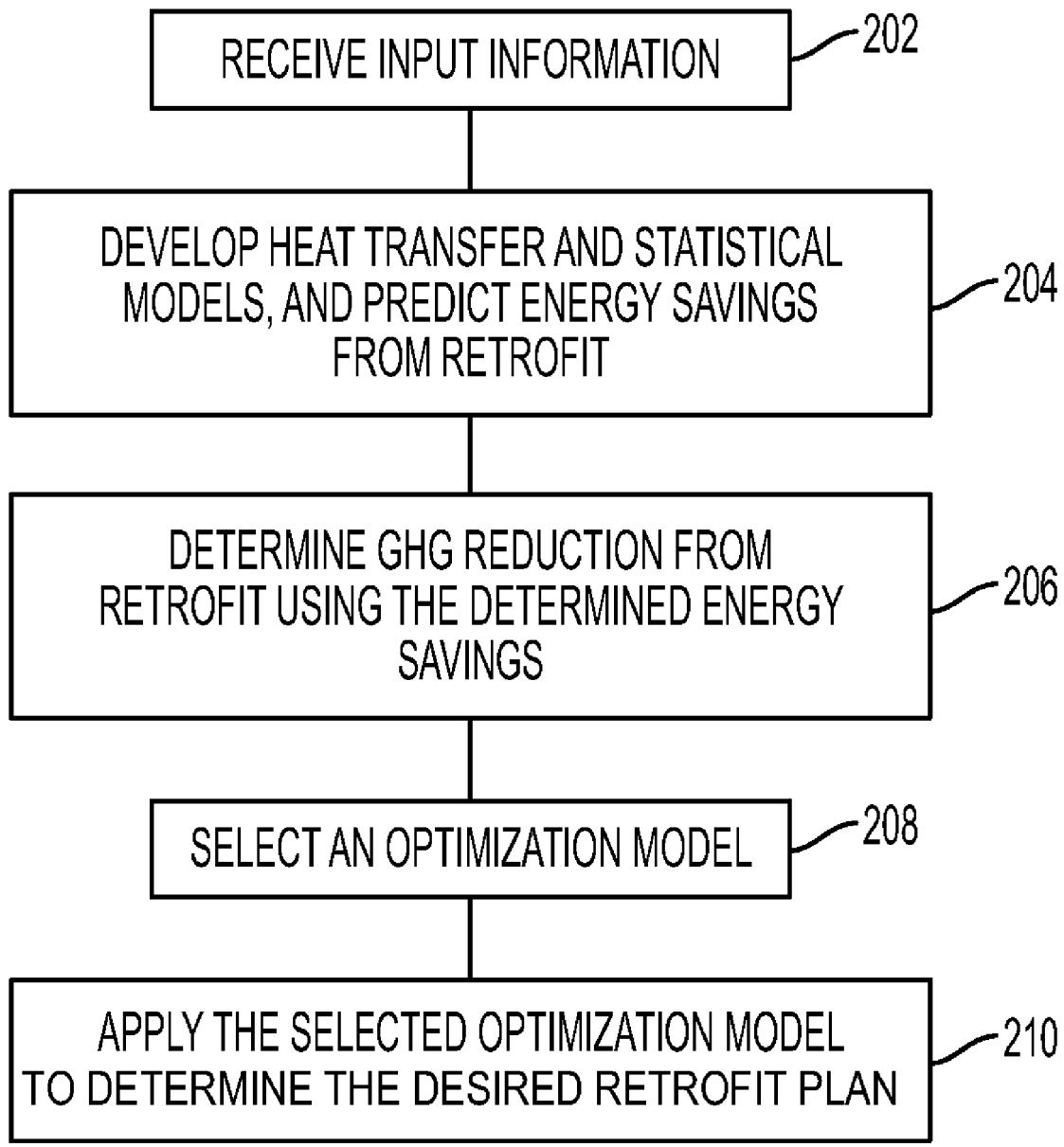
FIG. 2 is a flow diagram illustrating a method of the present disclosure in one embodiment.

FIG. 2 is a flow diagram illustrating a method of the present disclosure in one embodiment. At 202, information such as the building candidates for retrofit, items to retrofit, retrofit costs, expected energy price, payback period and budget for retrofit is collected and received. At 204, energy savings from retrofit may be determined or predicted by developing and applying a heat transfer model. The heat transfer model, for instance, provides energy savings associated with heating and/or cooling. Energy savings may be determined or predicted by developing and using another model, for example, a regression model that describes energy usage in terms of building characteristics based on historical energy usage data in the building being considered for retrofitting.

At 206, GHG reduction from retrofit may be determined from the determined energy savings from retrofit.

The information is input to an optimization model. Depending on the desired reduction, different models may be applied. For instance, if a retrofit plan that maximizes energy reduction is desired, an optimization model whose objective function is to maximize energy reduction is utilized. If a retrofit plan that maximizes GHG reduction is desired, an optimization model whose objective function is to maximize GHG reduction is utilized. If a retrofit plan for maximum cost reduction is desired, an optimization model whose objective function is to maximize cost reduction is utilized.

At 208, an optimization model is selected depending on the desired objective. At 210, the optimization model is used to determine a retrofit plan that meets the objective.

Figure 3:
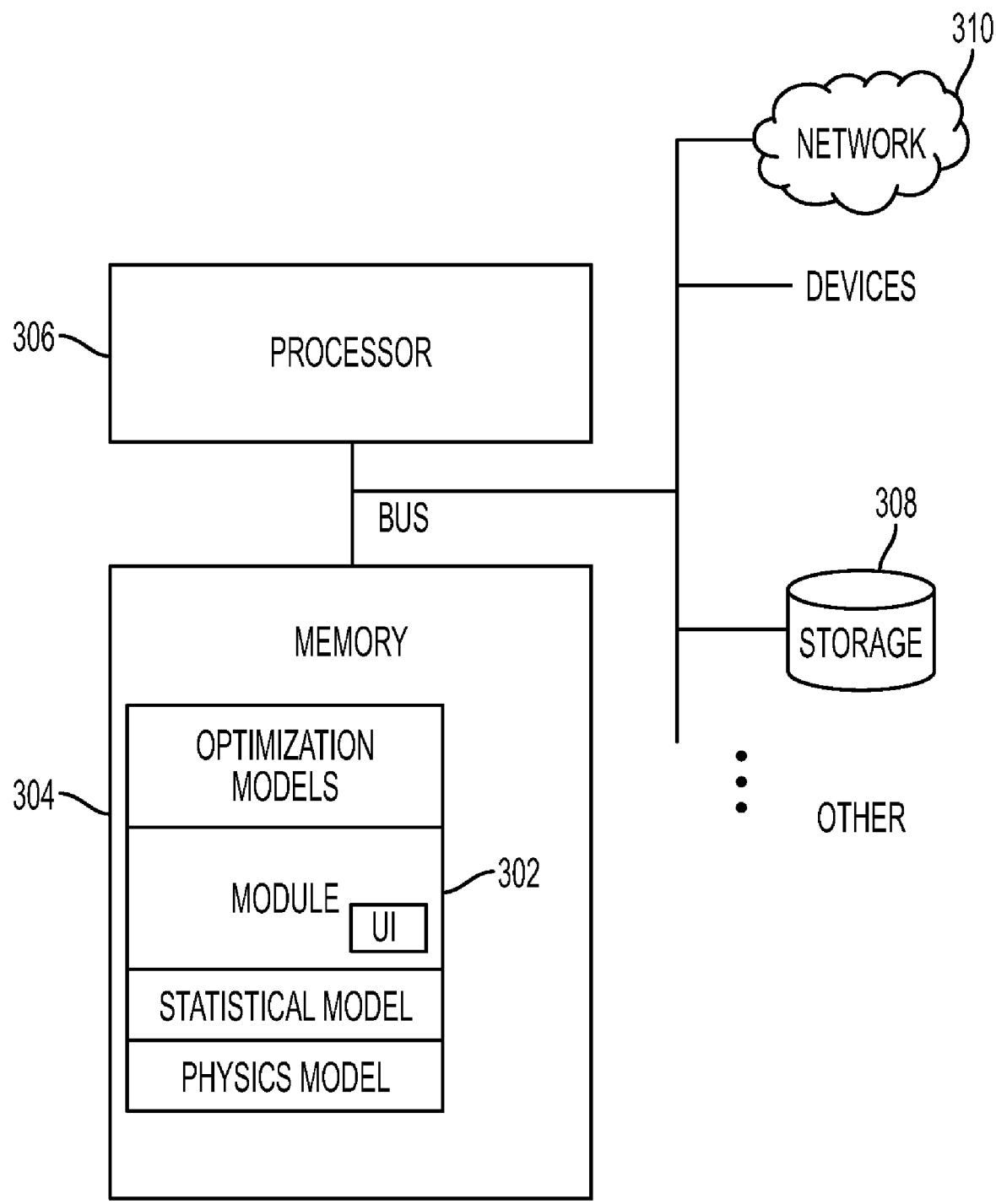
FIG. 3 shows system components in one embodiment of the present disclosure that may run or implement the methodologies of the present disclosure.

FIG. 3 shows system components in one embodiment of the present disclosure that may run or implement the methodologies of the present disclosure. A module 302 implementing the methodologies of the present disclosure may be loaded or stored in memory 304 and executed by a computer processor 306 or the like. In one aspect, the module 302 may include and utilize the optimization models for determining a building retrofit plan based on different objectives as discussed above (e.g., maximizing energy reduction, maximizing GHG reduction, maximizing cost reduction). The module 302 may also include a physics model that describes heat transfer dynamics in a building and a statistical model that describes the building's energy usage in terms of building characteristics. The module 302 may also include a software user interface that allows a user to input the information and select a desired optimization model. In another aspect, the module 302 may automatically retrieve the input information and select an optimization model based on pre-stored or pre-defined information. The module 302 may be stored permanently in a persistent storage device (e.g., 308) and/or transmitted via a network 310 and loaded into memory 304. Similarly, the module 302 may receive input information by accessing or reading data stored in storage 308 or transmitted via a network 310. The architecture and operations of the system and methodologies of the present disclosure are not limited only to the configuration shown in FIG. 3. For instance, in another aspect, the optimization models and/or the module may be architected as a circuit of a processor.

Figure 4A:
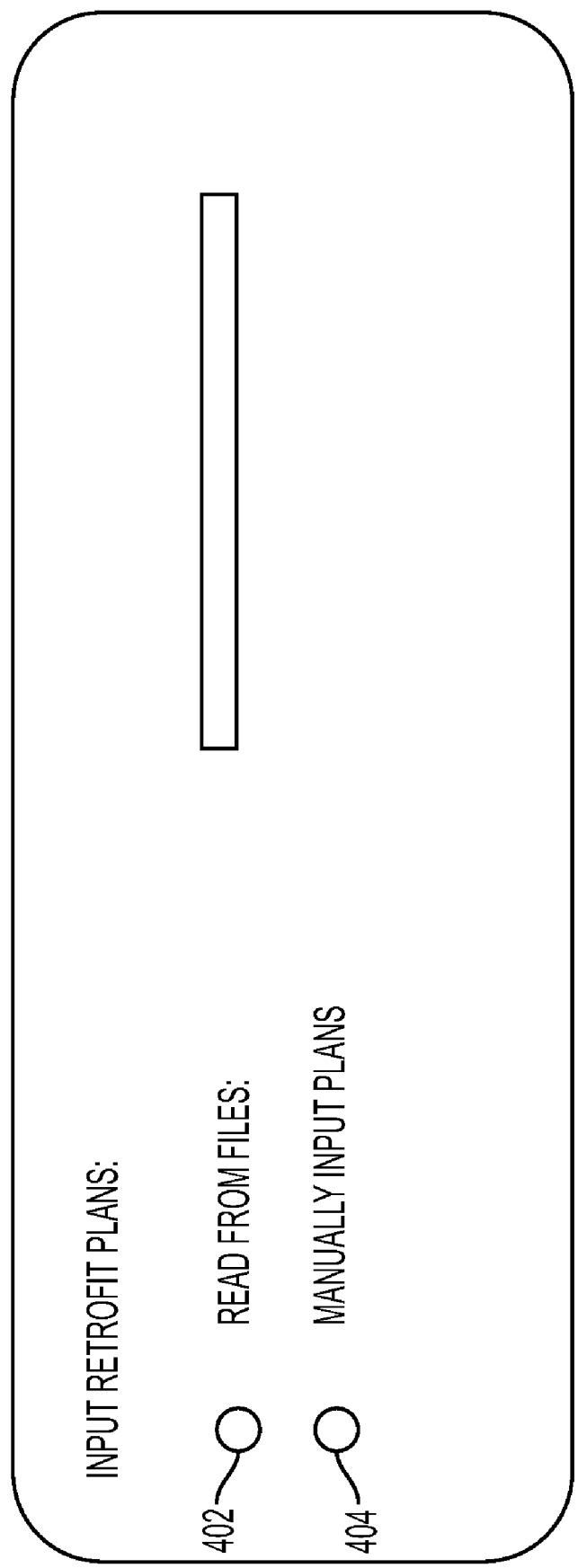
FIGS. 4A-4H illustrate examples of user interface dashboards or screens that may interact with a user performing one or more optimizations of the present disclosure in one embodiment.

FIGS. 4A-4H illustrate examples of user interface dashboards or screens that may interact with a user performing one or more optimizations of the present disclosure in one embodiment. It should be understood that any other methodologies may be used to receive input for performing the optimizations described above, and presenting the outputs, e.g., an optimal plan for building retrofit. Thus, the dashboards shown in FIG. 4A through FIG. 4H are shown as examples only, as the methodologies are not limited only to the shown examples. FIG. 4A illustrates an example user interface in which a user may indicate the source of the data to be used for optimization. For instance, the user may select a radio button "read from files" 402, which would tell the methodologies of the present disclosures to read the data from one or more computer files, e.g., specified by the user. In another embodiment, there may be a default file or file name that may be read. Such files may include text files, database tables, extensible markup language (XML) files, or for example, any other files readable by a computer or a machine. A user may select a "manually input plans" radio button 404, to indicate that all or some of the inputs might be entered manually by the user, for example, via additional input dashboard, screen. If the user selects the "read from files" radio button 402, the methodologies of the present disclosure reads the data automatically from a specified file. If the "manually input plans" radio button 404 is selected, one or more additional dashboards may be presented to allow the user to enter the data.

Figure 4B:
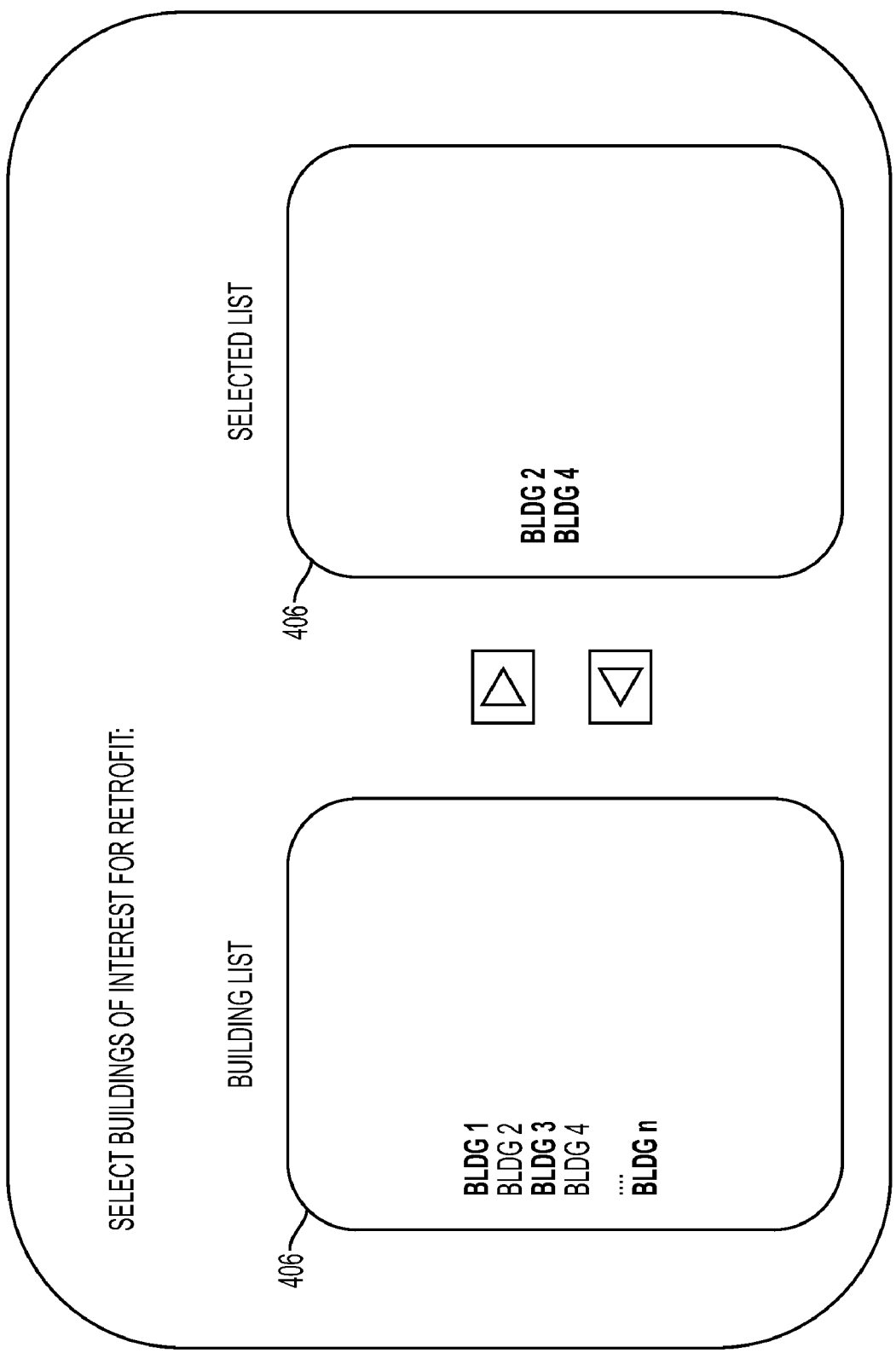
Figure 4C:
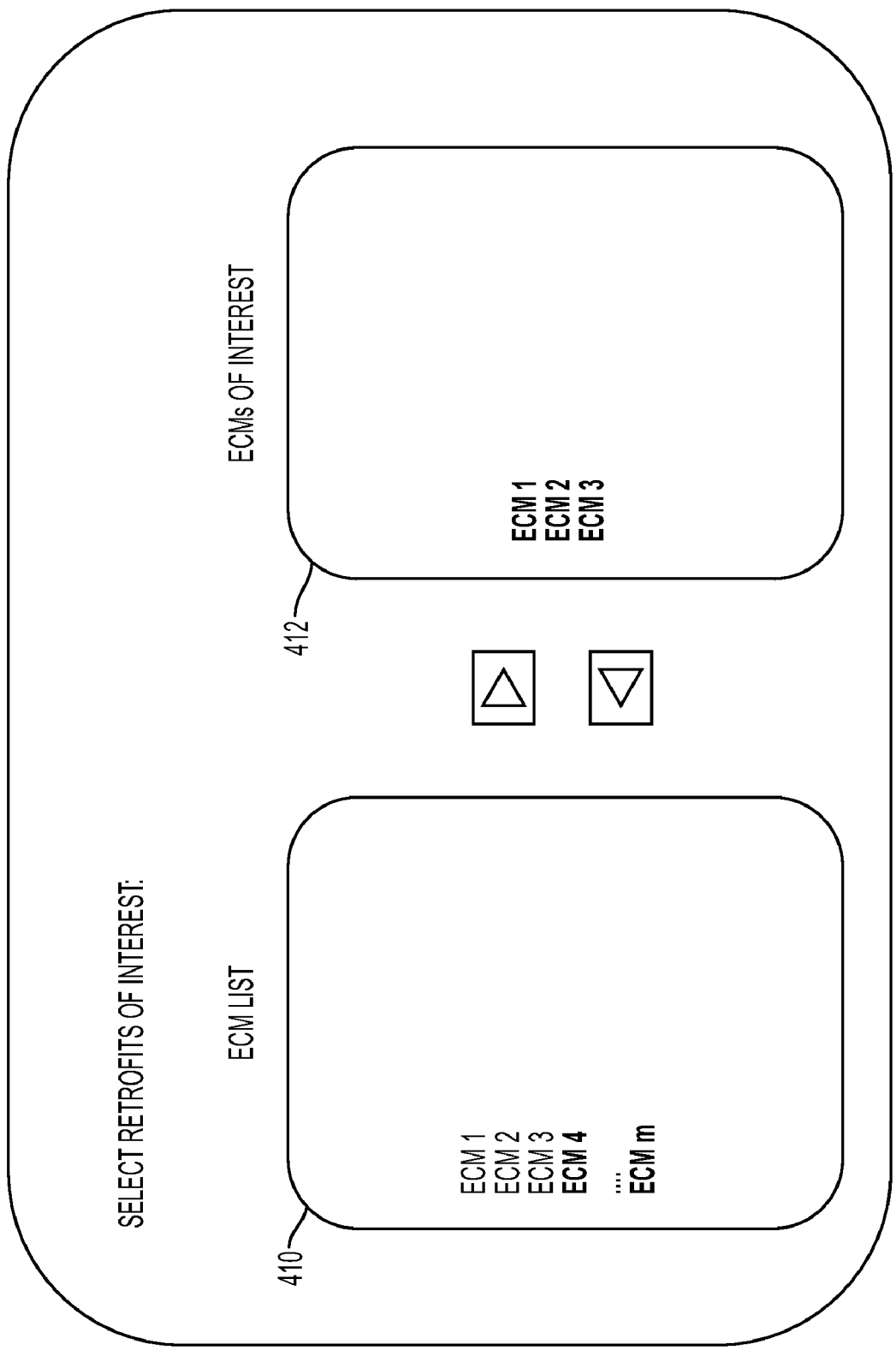
Figure 4D:
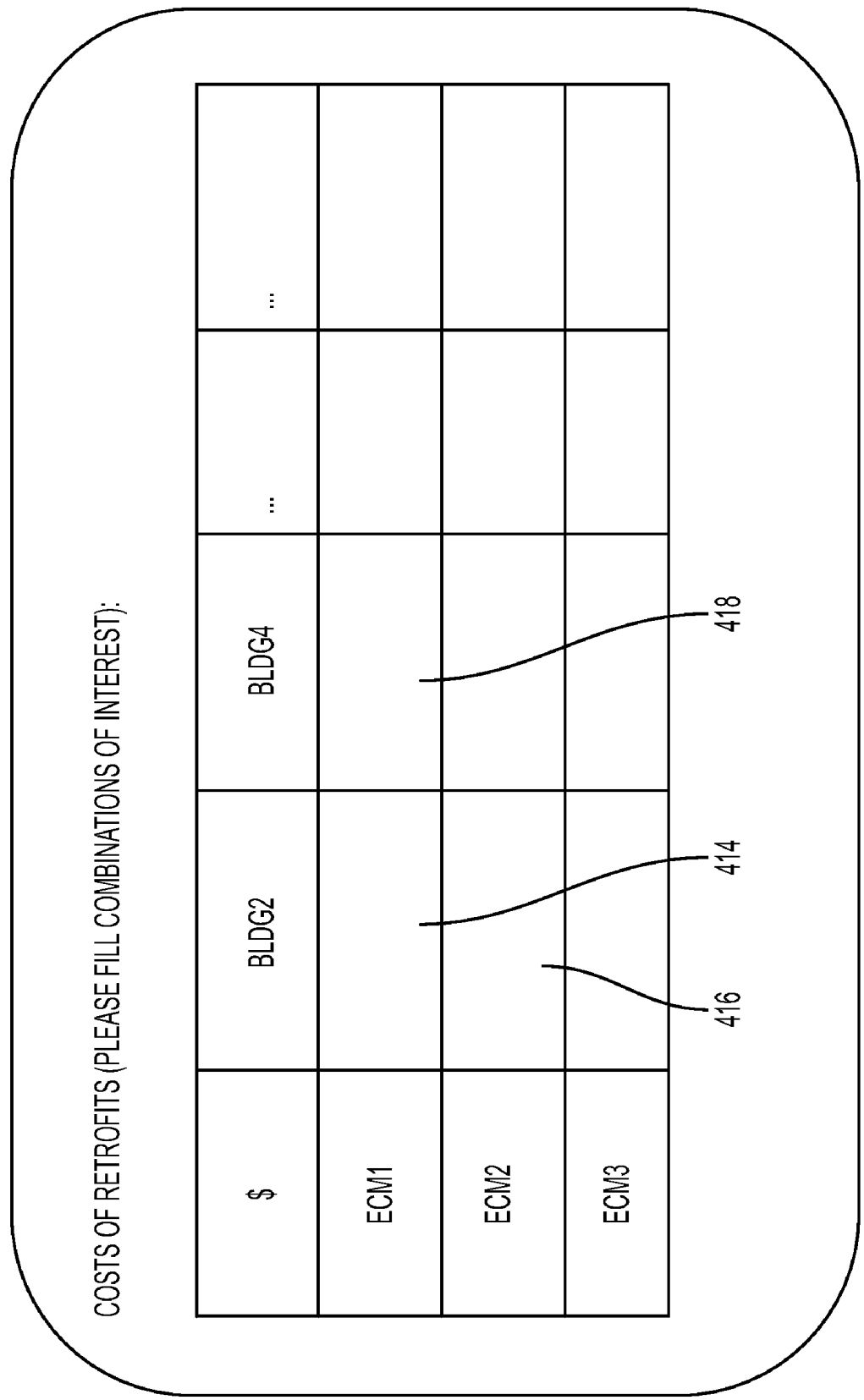
Figure 4E:
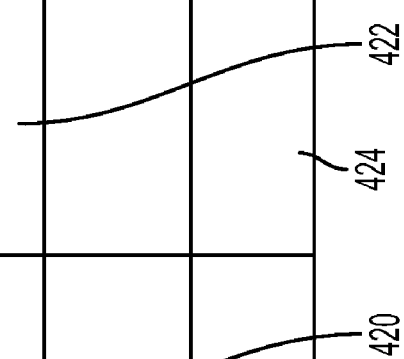
Figure 4F:
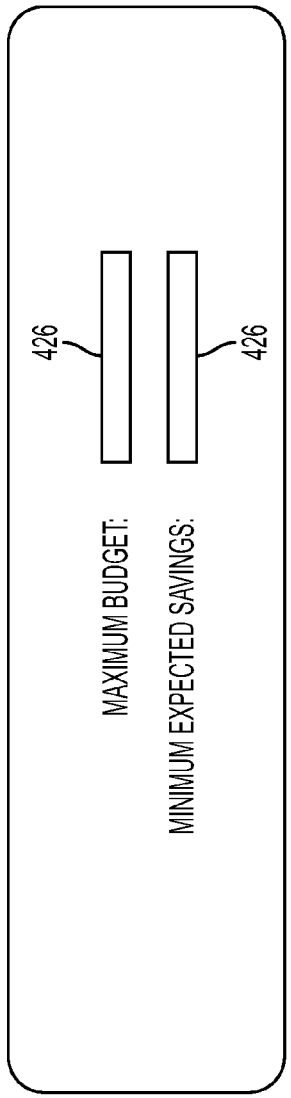
Figure 4G:
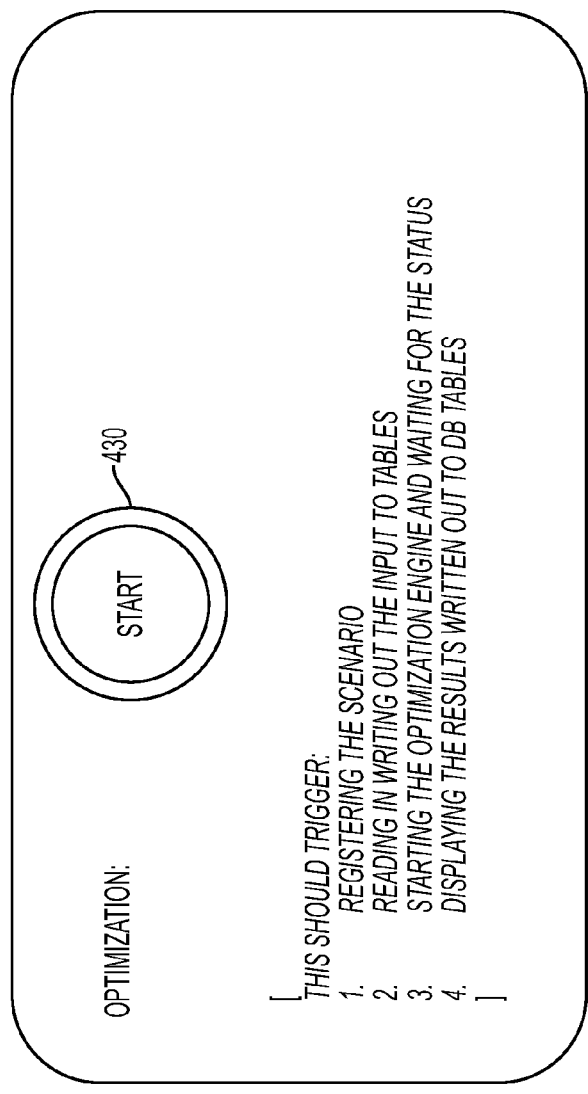
Figure 4H:
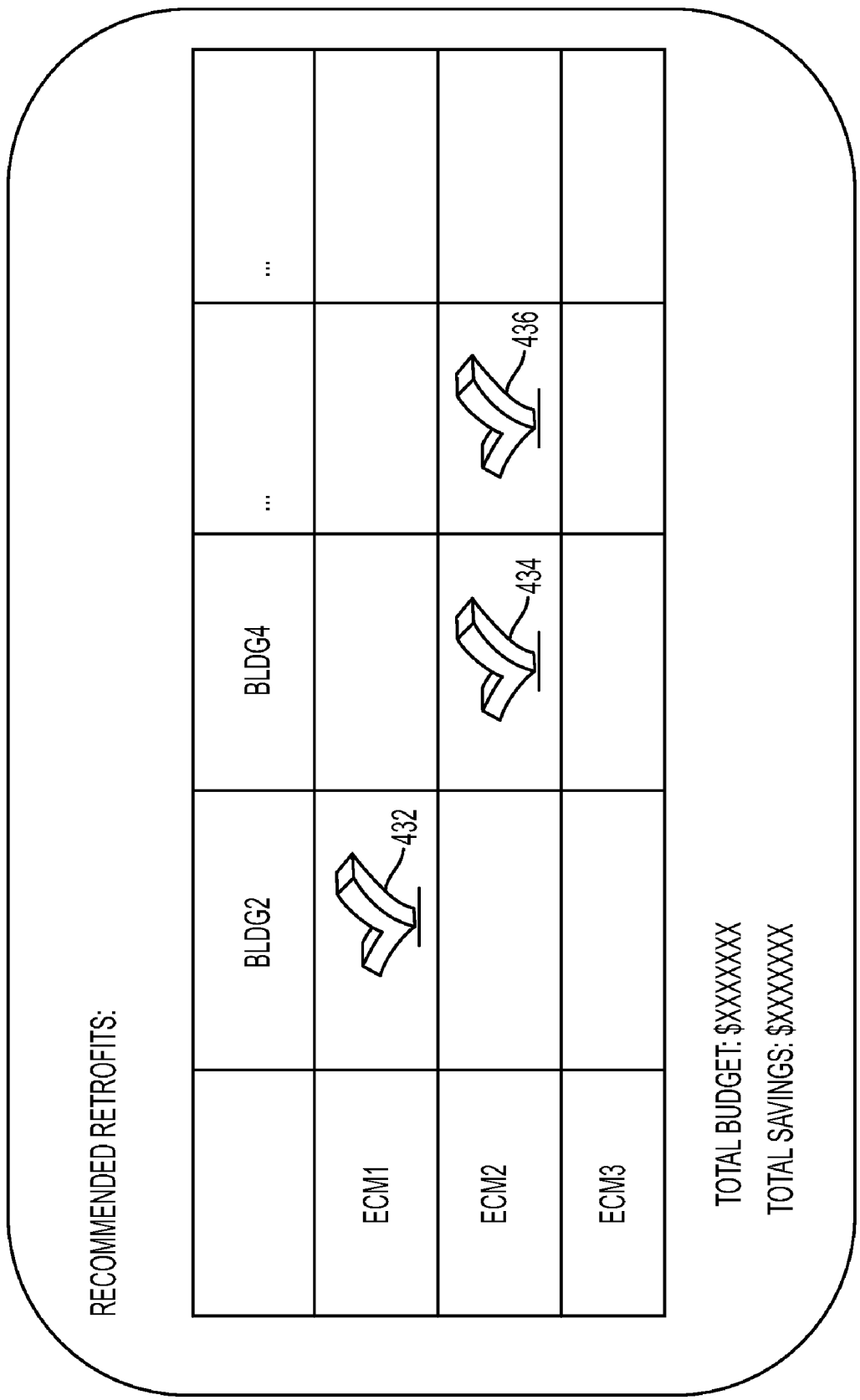

FIG. 4B illustrates an example dashboard via which a user may select buildings of interest for retrofit. For instance, a list of all available buildings 406 may be provided, and a user may be enabled to select a possible list of buildings 408, e.g., candidate buildings for retrofit. FIG. 4C illustrates an example dashboard via which a user may select ECMs of interest for retrofit. For instance, a list of all available ECMs 410 may be provided, and a user may be enabled to select a possible list of desired ECMs 412. FIG. 4D illustrates an example dashboard via which the data associated with cost for each selected retrofit may be entered. For instance, a user may enter into an input field 414, the cost to retrofit ECM1 in BLDG2. Likewise, a user may enter into an input field 416, the cost to retrofit ECM2 in BLDG2. Similarly, a user may enter into an input field 418, the cost to retrofit ECM1 in BLDG4, and so forth. FIG. 4E illustrates an example dashboard via which the data associated with the expected savings from the selected retrofit may be entered. For instance, a user may enter into input field 420, the expected savings from retrofitting BLDG2 with EMC1; a user may enter into input field 422, the expected savings from retrofitting BLDG4 with ECM1; a user may enter into an input field 424, the expected savings from retrofitting BLDG4 with ECM3, and so forth. FIG. 4F shows an example dashboard for entering maximum budget 426 allotted for retrofit, and minimum expected savings from retrofit 428. FIG. 4G illustrates an example dashboard for initiating an optimization procedure according to one embodiment of the present disclosure. A user may push a "start" button 430, to being the optimization process. In response, the methodologies of the present disclosure in one embodiment may register a user scenario, for instance, using the entered input data and/or additional data read from one or more files. The methodologies of the present disclosure in one embodiment may also create a table of input data to be used for optimization. An optimization engine starts and uses the input data to compute the decision variables according to a selected objective function. Based on the solution output by the optimization engine, the methodologies of the present disclosure in one embodiment may display an optimal plan for building retrofit. FIG. 4H illustrates and example dashboard that displays an optimal plan in one embodiment of the present disclosure. The dashboard shows that an optimal plan would be to retrofit Bldg2 with ECM1 and Bldg4 with ECM2, for maximizing the desired or selected objective function, as shown by the checkmarks 432, 434, 436. The dashboard also may show the total budget and total saving resulting from carrying out the recommended optimal plan.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of generating a planning of building retrofit for a portfolio of buildings, comprising:

receiving input information including at least a retrofit cost for retrofitting a building, payback period specifying the length of time needed to recover the retrofit cost, a budget available for retrofitting the building, expected price of energy, estimated energy savings from retrofitting and estimated green house gas emission from retrofitting;

selecting an optimization model based on an objective, the objective including maximizing cost reduction, maximizing green house gas emission reduction, or maximizing energy reduction, or combinations thereof; and generating, by a processor, the planning of building retrofit by computing the selected optimization model and the retrofit cost for retrofitting a building, the payback period specifying the length of time needed to recover the retrofit cost, the budget available for retrofitting the building, the expected price of energy, the estimated energy savings from retrofitting and the estimated green house gas emission from retrofitting, wherein the selected optimization model comprises at least:

$$\max ROI = \max \sum_i \sum_j \sum_k R_{i,j}(E_{i,j} \cdot P_k \cdot N_i - C_{i,j})$$

$$s.t. \sum_j \sum_i R_{i,j} C_{i,j} \leq B$$

$$R_{i,j} \in \{0, 1\} \ \forall \ i, j$$

for generating the planning that maximizes cost reduction, wherein $i \in \{ECM\}$,
$j \in \{Bld\}$,
$k \in \{Time\}$ in periods,
$R_{i,j} \in \{0,1\}$ associated with ECM i in building j,
$C_{i,j}$=cost for retrofit associated with ECM i in building j,
$E_{i,j}$=energy reduction of retrofit associated with ECM i in building j,
$P_k$=expected energy price during period k,
$N_i$=payback in number of time periods associated with ECM i,
B=budget for retrofit.

2. The method of claim 1, wherein the optimization model includes:

$$\max \text{ Energy Reduction} = \max \sum_{i \in ECM} \sum_{j \in BLD} R_{i,j} \cdot E_{i,j}$$

for generating the planning that maximizes green house gas emission reduction, wherein
$R_{i,j} \in \{0,1\}$,
$e_{i,j}$=energy reduction of retrofit associated with ECM i in building j.

3. The method of claim 1, wherein the optimization model includes:

$$\max GHG \text{ Reduction} = \max \sum_{i \in ECM} \sum_{j \in BLD} \sum_{l \in ENR} R_{i,j}(E_{i,j} \cdot G_l)$$

for generating the planning that maximizes energy reduction, wherein
$l \in \{Eng\}$ energy type,
$R_{i,j} \in \{0,1\}$ associated with ECM i in building j,
$E_{i,j}$=energy reduction of retrofit associated with ECM i of building j,
$G_l$=GHG emission for each energy type.

4. The method of claim 1, further including:
developing a heat transfer model associated with the building; and
estimating the energy savings from retrofitting based on the developed heat transfer model.

5. The method of claim 4, further including:
estimating the green house gas emission from retrofitting based on the estimated energy savings from retrofitting.

6. The method of claim 4, wherein the heat transfer model includes:

$$Q_{sys} = (h_{q,wall}A_{wall} + h_{q,roof}A_{roof} + h_{q,win}A_{win} + \dot{m}_{inf}C_p)\int_{t_0}^{t_1}(T_z - T_{amb}(\tau))^+ d\tau =$$

$$\left(\frac{A_{wall}}{R_{wall}} + \frac{A_{roof}}{R_{roof}} + \frac{A_{window}}{R_{window}} + \dot{m}_{inf}C_p\right)\int_{t_0}^{t_1}(T_z - T_{amb}(\tau))^+ d\tau$$

wherein, $h_{q,wall}$, $h_{q,roof}$, $h_{q,win}$, $\dot{m}_{inf}$ represent heat transfer coefficients for wall, roof, windows and infiltration of outside air into a building respectively;
$A_{wall}$, $A_{roof}$, $A_{win}$ represent areas of wall, roof and window in a building, respectively;
$C_p$, $T_z$, $T_{amb}$ represent specific heat of air inside a building, temperature of inside of a building zone, and ambient outside temperature, respectively;

τ represents an integration variable; and $R_{wall}$, $R_{roof}$, $R_{win}$ represent heat resistance coefficients of wall, roof and window, respectively.

7. The method of claim 1, wherein further including:
developing a statistical regression model that describes energy usage of a building in terms of building characteristics; and
predicting the energy savings from retrofitting based on the statistical regression model.

8. The method of claim 7, further including:
estimating the green house gas emission from retrofitting based on the predicted energy savings from retrofitting.

9. The method of claim 7, wherein the statistical regression model includes:

$$E_{j,energy\ type} = \beta_0 + \beta_1 x_1 + \beta_2 x_2 + \beta_3 x_3 + \ldots + \epsilon_{energy\ type}$$

wherein $x_i$ represents building characteristic i, $\beta_0$ is a constant value contributing to building j's energy usage, which is not associated with building characteristics, $\beta_i$ represents a coefficient value that a building characteristic $x_i$ contributes to the energy usage in that building, and $\epsilon$ is an error value, which cannot be attributed to the building characteristics or other energy usage in building j.

10. A computer readable storage medium storing a program of instructions executable by a machine to perform a method of generating a planning of building retrofit for a portfolio of buildings, comprising:
receiving input information including at least a retrofit cost for retrofitting a building, payback period specifying the length of time needed to recover the retrofit cost, budget available for retrofitting the building, expected price of energy, estimated energy savings from retrofitting and estimated green house gas emission from retrofitting;
selecting an optimization model based on an objective, the objective including maximizing cost reduction, maximizing green house gas emission reduction, or maximizing energy reduction, or combinations thereof; and
generating the planning of building retrofit by calculating the selected optimization model and the generating the planning of building retrofit based on the selected optimization model and the retrofit cost for retrofitting a building, the payback period specifying the length of time needed to recover the retrofit cost, the budget available for retrofitting the building, the expected price of energy, the estimated energy savings from retrofitting and the estimated green house gas emission from retrofitting, wherein the selected optimization model comprises at least:

$$\max ROI = \max \sum_i \sum_j \sum_k R_{i,j}(E_{i,j} \cdot P_k \cdot N_i - C_{i,j})$$

$$s.t. \sum_j \sum_i R_{i,j} C_{i,j} \leq B$$

$$R_{i,j} \in \{0, 1\} \ \forall\ i, j$$

for generating the planning that maximizes cost reduction, wherein $i \in \{ECM\}$, $j \in \{Bld\}$, $k \in \{Time\}$ in periods, $R_{i,j} \in \{0,1\}$ associated with ECM i in building j, $C_{i,j}$=cost for retrofit associated with ECM i in building j, $E_{i,j}$=energy reduction of retrofit associated with ECM i in building j, $P_k$=expected energy price during period k, $N_i$=payback in number of time periods associated with ECM i, B=budget for retrofit.

11. The computer readable storage medium of claim 10, wherein the optimization model includes:

$$\max \text{Energy Reduction} = \max \sum_{i \in ECM} \sum_{j \in BLD} R_{i,j} \cdot E_{i,j}$$

for generating the planning that maximizes green house gas emission reduction, wherein $R_{i,j} \in \{0,1\}$ associated with ECM i in building j, $E_{i,j}$=energy reduction of retrofit associated with ECM i in building j.

12. The computer readable storage medium of claim 10, wherein the optimization model includes:

$$\max GHG\ \text{Reduction} = \max \sum_{i \in ECM} \sum_{j \in BLD} \sum_{l \in ENR} R_{i,j}(E_{i,j} \cdot G_l)$$

for generating the planning that maximizes energy reduction, wherein $l \in \{Eng\}$ energy type, $R_{i,j} \in \{0,1\}$ associated with ECM i in building j, $E_{i,j}$=energy reduction of retrofit associated with ECM i in building j, $G_l$=GHG emission for each energy type.

13. The computer readable storage medium of claim 10, further including:
developing a heat transfer model associated with the building; and
estimating the energy savings from retrofitting based on the developed heat transfer model.

14. The computer readable storage medium of claim 13, further including:
estimating the green house gas emission from retrofitting based on the estimated energy savings from retrofitting.

15. The computer readable storage medium of claim 13, wherein the heat transfer model includes:

$$Q_{sys} =$$

$$(h_{q,wall} A_{wall} + h_{q,roof} A_{roof} + h_{q,win} A_{win} + \dot{m}_{inf} C_p) \int_{t_0}^{t_1} (T_z - T_{amb}(\tau))^+ d\tau =$$

$$\left(\frac{A_{wall}}{R_{wall}} + \frac{A_{roof}}{R_{roof}} + \frac{A_{window}}{R_{window}} + \dot{m}_{inf} C_p\right) \int_{t_0}^{t_1} (T_z - T_{amb}(\tau))^+ d\tau$$

wherein, $h_{q,wall}$, $h_{q,roof}$, $h_{q,win}$, $\dot{m}_{inf}$ represent heat transfer coefficients for wall, roof, windows and infiltration of outside air into a building respectively;

$A_{wall}$, $A_{roof}$, $A_{win}$ represent areas of wall, roof and window in a building, respectively;

$C_p$, $T_z$, $T_{amb}$ represent specific heat of air inside a building, temperature of inside of a building zone, and ambient outside temperature, respectively;

τ represents an integration variable; and $R_{wall}$, $R_{roof}$, $R_{win}$ represent heat resistance coefficients of wall, roof and window, respectively.

16. The computer readable storage medium of claim 10, wherein further including:
  developing a statistical regression model that describes energy usage of a building in terms of building characteristics; and
  predicting the energy savings from retrofitting based on the statistical regression model.

17. The computer readable storage medium of claim 16, further including:
  estimating the green house gas emission from retrofitting based on the predicted energy savings from retrofitting.

18. The computer readable storage medium of claim 16, wherein the statistical regression model includes:

$$E_{j, energy\ type} = \beta_0 + \beta_1 x_1 + \beta_2 x_2 + \beta_3 x_3 + \ldots + \epsilon_{energy\ type}$$

wherein
  $x_i$ represents building characteristic i,
  $\beta_0$ is a constant value contributing to building j's energy usage, which is not associated with building characteristics,
  $\beta_i$ represents a coefficient value that a building characteristic $x_i$ contributes to the energy usage in that building, and
  $\epsilon$ is an error value, which cannot be attributed to the building characteristics or other energy usage in building j.

19. A system for generating a planning of building retrofit for a portfolio of buildings, comprising:
  a processor;
  a first optimization model with an objective function of maximizing cost reduction;
  a second optimization model with an objective function of maximizing green house gas emission reduction;
  a third optimization model with an objective function of maximizing energy reduction; and
  a module operable to execute on the processor, and further operable to receive a selected objective, and based on the selected objective, solve the first optimization model, the second optimization model, or the third optimization model, the module solving the first optimization model, the second optimization model, or the third optimization model based on data including at least a retrofit cost for retrofitting a building, payback period specifying the length of time needed to recover the retrofit cost, budget available for retrofitting the building, expected price of energy, estimated energy savings from retrofitting and estimated green house gas emission from retrofitting,
  the module further generating the planning of building retrofit based on the solving of at least the first optimization model, wherein the first optimization model comprises at least:

$$\max ROI = \max \sum_i \sum_j \sum_k R_{i,j}(E_{i,j} \cdot P_k \cdot N_i - C_{i,j})$$

$$s.t. \sum_j \sum_i R_{i,j} C_{i,j} \leq B$$

$$R_{i,j} \in \{0, 1\} \ \forall\ i, j$$

for generating the planning that maximizes cost reduction, wherein
  $i \in \{ECM\}$,
  $j \in \{Bld\}$,
  $k \in \{Time\}$ in periods,
  $R_{i,j} \in \{0,1\}$ associated with ECM i in building j,
  $C_{i,j}$=cost for retrofit associated with ECM i in building j,
  $E_{i,j}$=energy reduction of retrofit associated with ECM i in building j,
  $P_k$=expected energy price during period k,
  $N_i$=payback in number of time periods associated with ECM i,
  B=budget for retrofit.

20. The system of claim 19, wherein the optimization model includes:

$$\max \text{Energy Reduction} = \max \sum_{i \in ECM} \sum_{j \in BLD} R_{i,j} \cdot E_{i,j}$$

for generating the planning that maximizes green house gas emission reduction, wherein
  $R_{i,j} \in \{0,1\}$ associated with ECM i in building j,
  $E_{i,j}$=energy reduction of retrofit associated with ECM i in building j.

21. The system of claim 19, wherein the optimization model includes:

$$\max GHG\ \text{Reduction} = \max \sum_{i \in ECM} \sum_{j \in BLD} \sum_{l \in ENR} R_{i,j}(E_{i,j} \cdot G_l)$$

for generating the planning that maximizes energy reduction, wherein
  $l \in \{Eng\}$ energy type,
  $R_{i,j} \in \{0,1\}$ associated with ECM i in building j,
  $E_{i,j}$=energy reduction of retrofit associated with ECM i in building j,
  $G_l$=GHG emission for each energy type.

* * * * *